United States Patent [19]

Jones

[11] Patent Number: 5,347,896
[45] Date of Patent: Sep. 20, 1994

[54] AUTOMATED COLLET LOADING FOR THE MANUFACTURE OF CONTACT LENSES

[75] Inventor: Thomas G. Jones, Rochester, N.Y.

[73] Assignee: Bausch & lomb Incorporated, Rochester, N.Y.

[21] Appl. No.: 994,567

[22] Filed: Dec. 21, 1992

[51] Int. Cl.$^5$ .......................... B23B 5/00; B23B 13/02; B23B 31/20; B23B 13/10
[52] U.S. Cl. ......................... 82/125; 82/124; 451/331; 414/746.4; 279/2.02; 279/43.2
[58] Field of Search .................. 279/43.1, 124, 125, 279/126, 127; 279/2.02, 2.22, 23.1, 43.2, 80; 269/48.1; 414/746.4; 51/215 R, 215 H, 215 UE, 216 LP

[56] References Cited

U.S. PATENT DOCUMENTS

| | | | |
|---|---|---|---|
| 2,605,538 | 8/1952 | Cuttat | 82/124 |
| 3,079,737 | 3/1963 | Kratt | |
| 3,162,315 | 12/1964 | Holden | 82/127 |
| 3,549,158 | 12/1970 | Smith | 279/2.02 |
| 3,763,597 | 10/1973 | Schlotfeldt | 51/33 R |
| 3,909,982 | 10/1975 | Schlotfeldt | 51/58 |
| 4,068,545 | 1/1978 | Scheler | 82/125 |
| 4,136,488 | 1/1979 | Wunder | 51/58 |
| 4,210,038 | 7/1980 | Hill | 82/11 |
| 4,277,916 | 3/1980 | Buhler | 51/217 L |
| 4,404,878 | 9/1983 | Blanchard et al. | 82/127 |
| 4,468,890 | 9/1984 | Nagaura | 51/3 |
| 4,562,671 | 1/1986 | Bouillon et al. | 51/216 LP |
| 4,584,148 | 4/1986 | Rawlings et al. | 82/1.11 |
| 4,924,739 | 5/1990 | Ademovic | 82/1.11 |
| 4,947,715 | 8/1990 | Council, Jr. | 82/1.11 |
| 5,205,076 | 4/1993 | Vernon et al. | 51/216 LP |

*Primary Examiner*—William E. Terrell
*Attorney, Agent, or Firm*—Craig E. Larson; John E. Thomas

[57] ABSTRACT

An apparatus is provided for automatic, intermittent feed of workpieces into a lathe. The apparatus includes a collet having a side entry for receiving workpieces and a workpiece positioning aperture, in alignment with the lathe spindle, for finally positioning the workpieces for machining. The collet further includes dowel pins that initially position the workpiece and a plunger that reciprocates intermittently to advance and press the individual workpieces into the positioning aperture. The apparatus includes a delivery chute for intermittently dropping the individual workpieces into the collet assembly side access for initial positioning. A control system positions the collet assembly to receive the workpiece, releases the workpiece from the delivery chute, actuates the plunger to press the workpiece into final position for machining, actuates machining, and, at its completion, actuates the plunger to withdraw the workpiece whereupon it drops from the machine by gravity.

10 Claims, 5 Drawing Sheets

AUTOMATED COLLET LOADING FOR THE MANUFACTURE OF CONTACT LENSES

BACKGROUND OF INVENTION

1. Field of the Invention

The invention relates to an apparatus for positioning workpieces in a lathe, wherein individual workpieces are fed into the lathe intermittently. More particularly, the invention relates to automatic feeding of contact lens molds into a lathe collet that positions and secures each mold for finish lathing of a surface of a contact lens formed in the mold.

2. Description of the Prior Art

In a conventional method for making contact lenses, a mold, having one surface conforming to a desired surface of the lens, typically a radius concave surface, is filled with a desired lens polymer. After the lens material cures, the exterior or exposed surface of the polymeric casting is lathed to produce the opposite surface of the contact lens. Typically, the lathing forms the posterior lens surface, adding optical power characteristics to the lens.

The lathing process involves securing the lens mold in a chucking device or collet that fixes the mold in coaxial alignment with the lathe spindle. A cutting tool is then brought into contact with the rotating mold, with the tool arranged and programmed to follow various pathways to achieve the desired finished surface.

The mold must be accurately positioned in the collet to ensure achieving a precisely machined optical surface on the lens. Both collet and mold design are important contributors in achieving satisfactory finished lenses. However, the process of loading the molds into the lathe requires such accuracy and dexterity that, conventionally, loading by hand by the lathe operator is necessary, which hand operation limits productivity of this process.

In Ademovic, U.S. Pat. No. 4,924,739, a method and apparatus for positioning contact lens molds for lathing is disclosed which includes a conically surfaced lens mold that conforms to an inner surface of a collet for fixing the lens mold into position for lathing. In operation, an operator must load the lens mold into the hollow lathe spindle, connect an air line to the spindle which, when actuated, propels the mold into its final position within the collet, with the surface to be machined exposed. After machining, the operator must reverse the operation, employing vacuum to extract the finished lens mold. The difficulty with this apparatus and method is that while the accuracy of positioning the mold and the collet is addressed by the design of the mold and collet, the process requires that an operator must perform a number of manual tasks, which reduces overall productivity of the process.

Schlotfeldt, in U.S. Pat. No. 3,909,982, describes a contact lens polishing apparatus that is provided with an automatic feed system, wherein a chute delivers lens blanks onto a horizontal support, with the lens blanks facing upward. The individual blanks are advanced horizontally by a piston mechanism onto a pedestal which secures the blank in place and elevates it into contact with the polishing tool. The finished lens is pneumatically blown from the pedestal and then discharged from the machine. This machine, while eliminating hand feeding, is somewhat complex with the blanks traveling a rather complex pathway.

It remains desirable in the processing of contact lenses and similar workpieces to improve productivity of a lathing step by providing an automatic feed apparatus for molds or workpieces that insures precision yet eliminates manual operation of the system, by means of a simple, reliable feeding and discharge apparatus, including a collet assembly having an improved design for initial positioning of the molds or workpieces.

SUMMARY OF THE INVENTION

The present invention provides a method and apparatus for lathing contact lenses or other small, similar workpiece in which the lens blanks or molds fall from a delivery chute, intermittently, and are side loaded into a specially designed collet assembly. The collet assembly includes means for initially positioning the delivered mold sufficiently accurately such that no manual loading or positioning operation is required. An intermittently actuated plunger finally positions the mold for precise machining. When the machining is complete the plunger withdraws, stripping off the mold which drops by gravity from the machine.

A key element of the invention is a collet nosepiece, which, preferably by means of a faceplate that adds stability and strength to the system, is fixed for rotation about its longitudinal axis in axial alignment with the lathe spindle. The nosepiece is substantially hollow at its distal end. A portion of the nosepiece lateral cylindrical surface is bored out to accommodate the mold dropping into the nosepiece hollow cylinder portion through the lateral or side boring. The mold is confined between the distal endwall and the inner transverse wall created by the lateral boring and, opposite the lateral side opening, a plurality of dowel pins positioned for stopping and initially positioning the mold. Both the distal endwall and the inner transverse wall are axially bored. The endwall boring accommodates, receives and includes surfaces for finally positioning the lens mold for lathing. The inner transverse wall is axially bored to accommodate an axially, intermittently, reciprocating plunger that passes through the inner transverse wall to urge and secure the lens mold in the axial endwall boring for lathing.

DETAILED DESCRIPTION OF THE INVENTION

Figure 1:
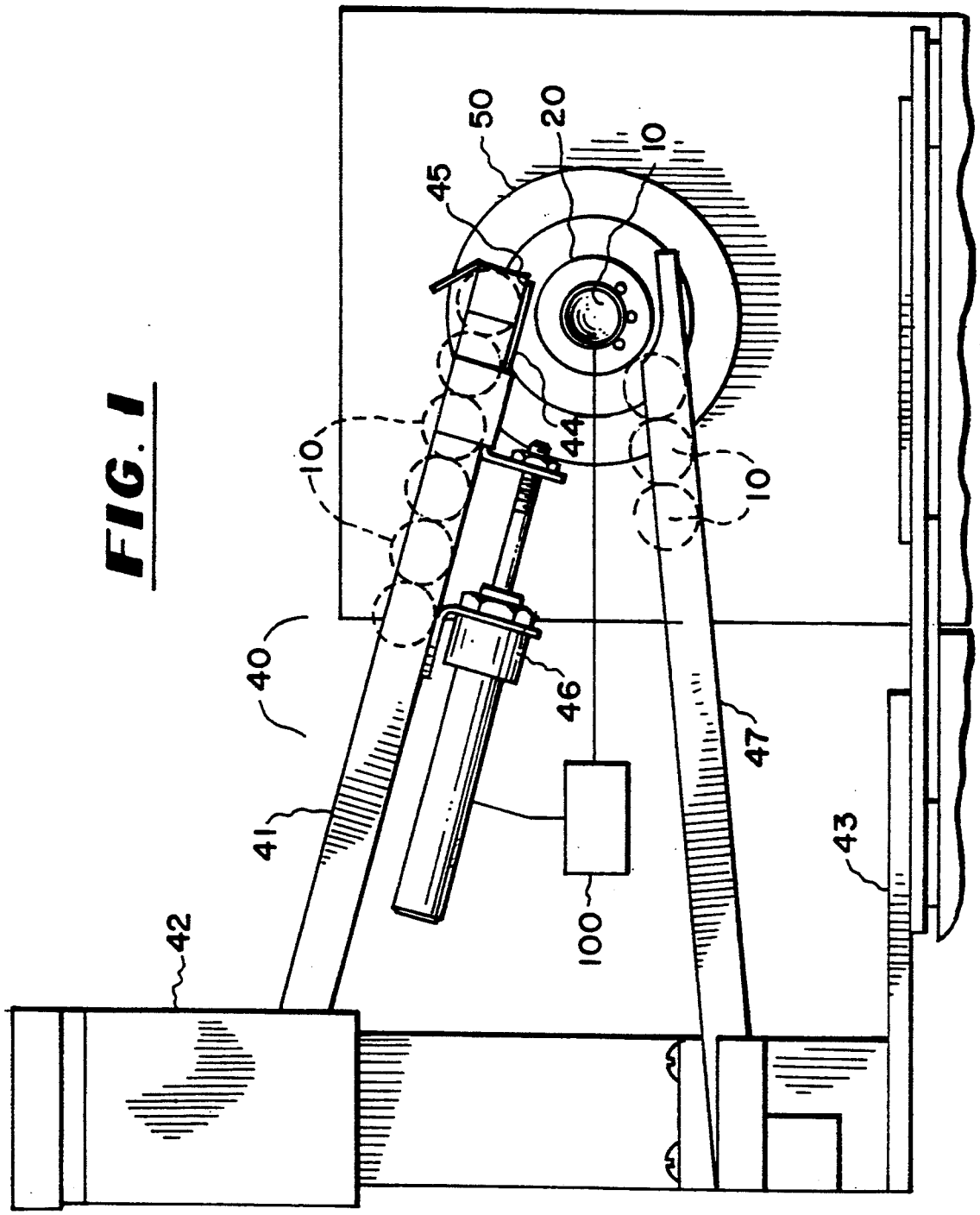
FIG. 1 is a schematic end view of the contact lens mold feeding apparatus of the invention, including a collet assembly.

Referring to FIG. 1, the apparatus of the invention for automated, intermittent feed of a small workpiece, into a collet assembly 20 of a lathe 50 for machining is shown. The apparatus of the invention is preferably directed to precise lathing of contact lenses that are formed, typically, in a cylindrical lens mold 10.

Figure 2:
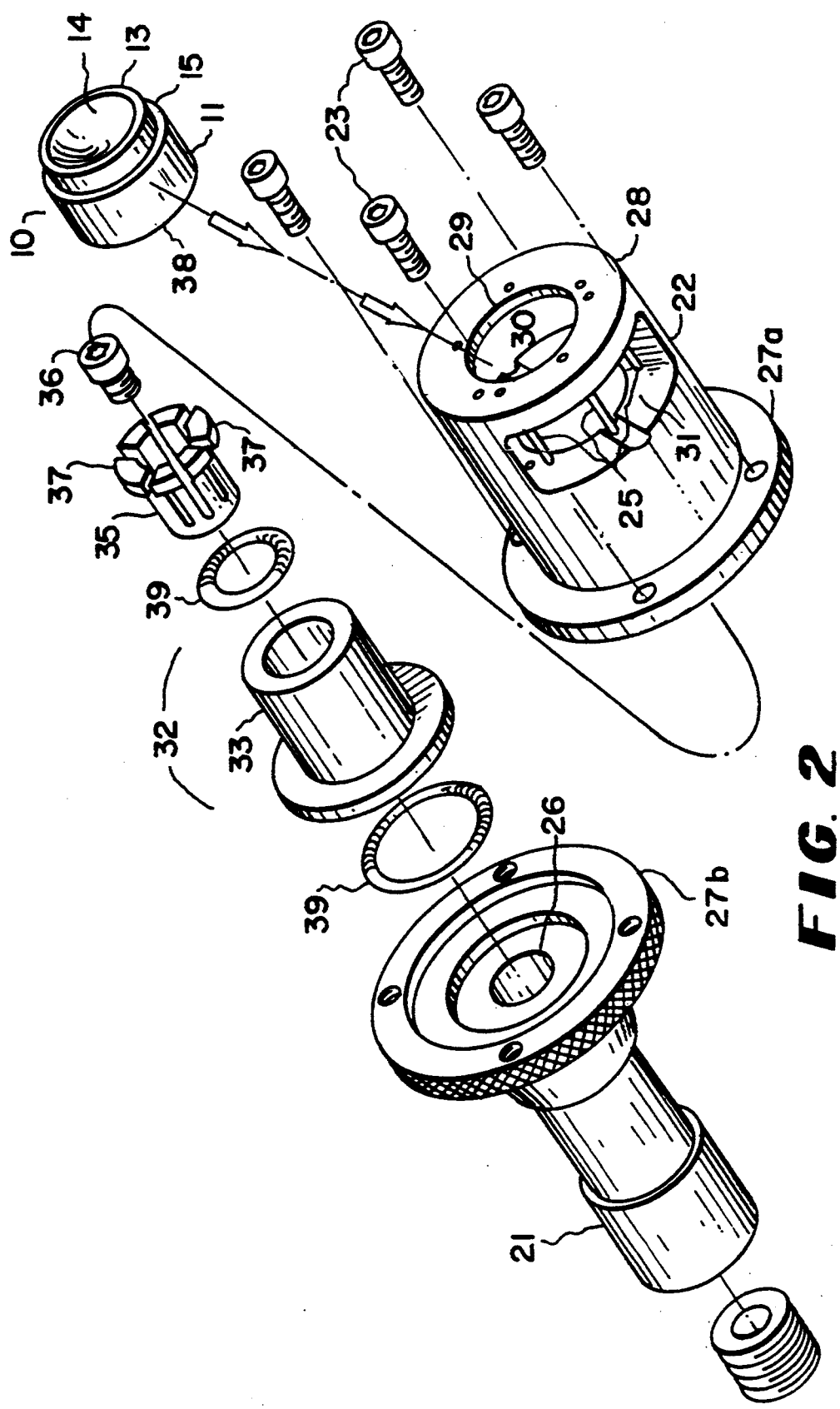
FIG. 2 is a perspective view of the collet assembly of the invention.
Figure 4:
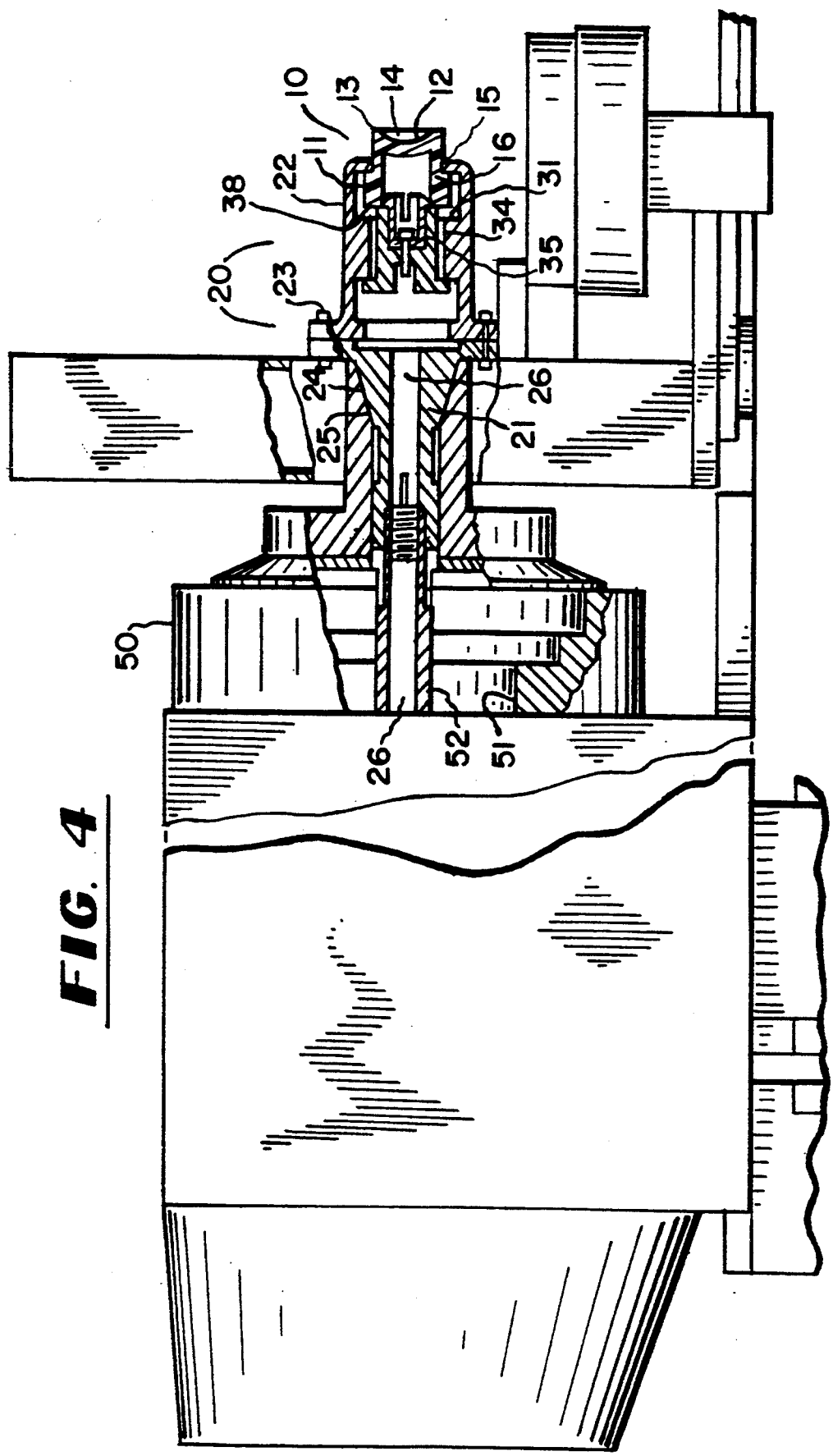
FIG. 4 is a schematic and partial sectional elevation of the collet assembly of FIG. 2 fitted to a lathe spindle.

As shown in FIGS. 2 and 4, the lens mold 10 includes a cylindrical surface 11 suitable for chucking into a lathe machine collet 20. The mold 10 includes a lens forming surface 12, which surface conforms to a desired contact lens surface, typically, the anterior surface of a contact lens. An amount of polymer is introduced onto the lens forming surface 12 and, confined by forming walls 13 of the mold, cures to form a surface 14 onto which the posterior surface of the lens is lathed.

Referring to FIG. 1, the automated, intermittent feed apparatus for feeding contact lens molds 10 into a lathe includes a lathe collet assembly 20 in combination with a means 40 for delivering molds into the collet and a control means 100 (shown schematically) that actuates and sequences delivery, lathing and discharge of the molds.

The means 40 for delivering molds into the lathe collet 20 includes a chute 41 fixed to a support 42 that is mounted upon a base plate 43. The discharge end of the chute 41 includes a slide 44 forming a discharge slide gate 45 located directly above the collet 20 such that the molds may fall or drop by gravity into the collet. The discharge slide gate 45 is operated by means of a pneumatic operator 46 that is actuated by the control means 100.

A means for collecting the molds 10 after they have been lathed includes a collecting chute 47 which receives the finished molds and conveys them from the lathe. The receiving end of the collecting chute 47 is located such that the mold 10, upon release from the collet 20, drops by gravity into the collecting chute 47.

Referring to FIG. 4, a contact lens mold 10 is shown positioned and secured in the lathe collet assembly 20 for lathing. The collet assembly preferably includes a faceplate 21 which is fixed to a spindle 51 of the lathe 50. A nosepiece 22 is attached by means of fasteners 23 to the faceplate. The lathe spindle 51, faceplate 21 and nosepiece 22 are in axial alignment and rotatable, at lathing speeds, about said axis.

The faceplate 21 is threaded onto a drawbar shaft 52. The spindle 51, the shaft 52 and faceplate 21 are axially bored to provide a passageway 26 for pressurized air or vacuum to operate the nosepiece, as will be described below. The faceplate includes conical surfaces 24 that bear upon opposed matching surfaces 25 of the spindle 51, such that threading the faceplate onto the drawbar wedges the faceplate in place, reinforcing and stiffening the assembly.

Figure 3:
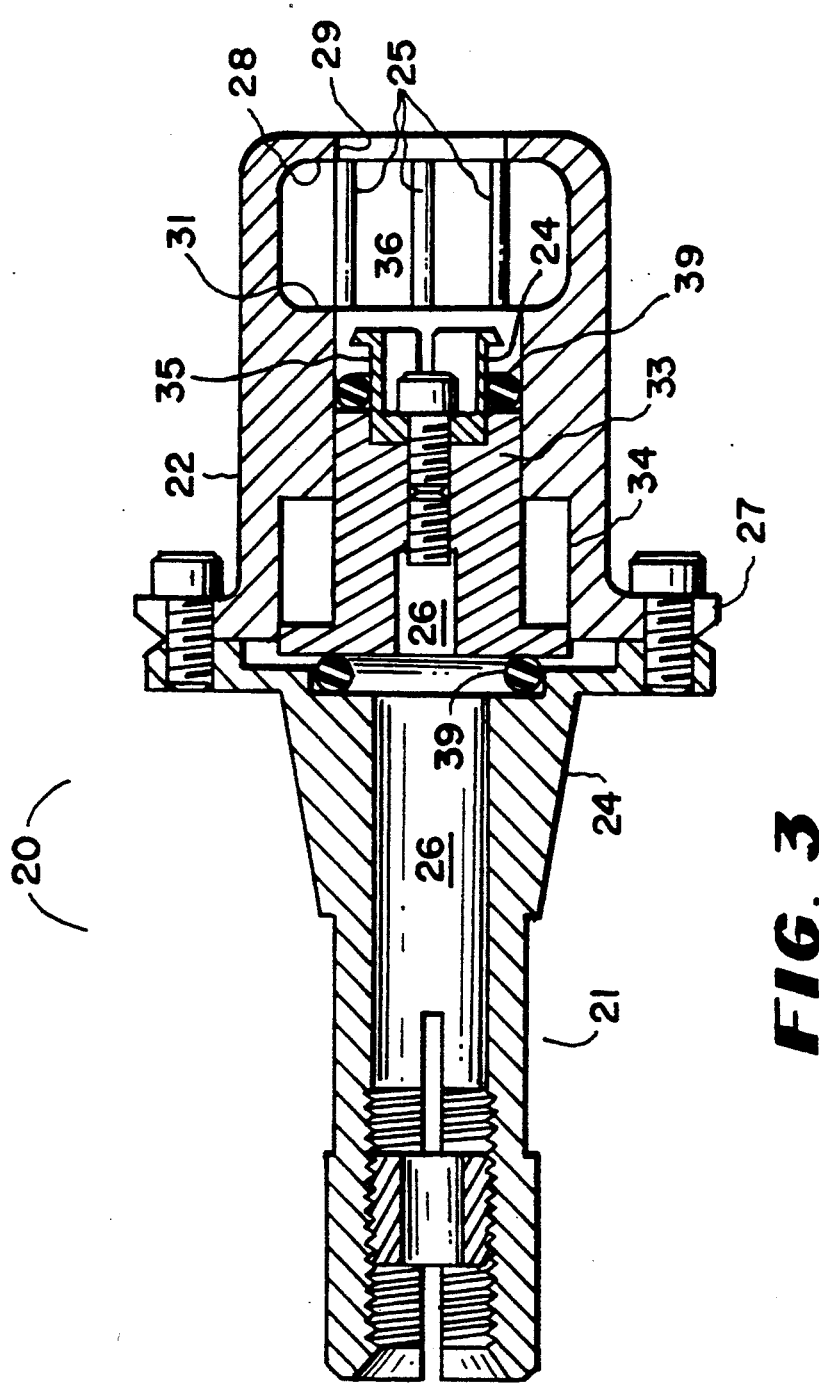
FIG. 3 is a sectional elevational view of the collet assembly of FIG. 2.

Referring to FIGS. 2, 3 and 4, the nosepiece 22 of the invention is shown in detail. The nosepiece functions to initially position the mold received from the delivery chute 41 sufficiently accurately that it may be subsequently advanced and pressed into its final position for machining without the need of human intervention. Productivity is substantially increased by the capability of the nosepiece to initially position the mold. As shown in FIGS. 2 and 3, the nosepiece is substantially a hollow, flanged cylinder. The flange 27a facilitates fixing the nosepiece to corresponding faceplate flange 27b, by means of cap screws 23.

A distal end wall 28 of the nosepiece is provided with an axial bore or aperture 29 that precisely positions the mold 10 during machining. The aperture 29 is of such diameter as to engage a stop 15 on the mold 10 when the mold is advanced into final positioning, as will be described below.

As shown in FIG. 2, the distal end portion of the nosepiece is bored and apertured laterally to provide a side access 30 for the mold to enter into the nosepiece adjacent the positioning aperture 29, with the mold confined between the end wall 28 and an inner transverse wall 31. A plurality of dowel pins 25, opposite the lateral side access 30, stop and provide an initial positioning of the mold 10 opposite the positioning aperture 29.

Final positioning of the lens mold 10 is provided by means of a plunger assembly 32 which includes a flanged, cylindrical plunger 33 that is slidably fitted in an axial boring 34 in the nosepiece 22. A finger element 35 is fixed to the plunger 33 by means of a cap screw 36 and includes resiliently biased fingers 37 that engage the inner surfaces 16 of the mold 10. The plunger assembly 32 is advanced into contact with an initially positioned mold by means of pressurized air entering through passageways 26, which advance finally positions the mold in a fixed position for machining, as shown in FIG. 4. After machining is complete, vacuum is applied to the plunger and it retracts in axial boring 34. The mold is sufficiently engaged by the resilient fingers to be retracted from the positioning aperture 29 as the plunger retracts. The end wall 38 of the mold contacts the inner transverse wall 31 of the nosepiece, stripping the mold from the fingers. O-rings 39 cushion the reciprocating action of the plunger assembly.

In operation, contact lens molds 10 to be machined are fitted into the delivery chute 41, with their posterior surfaces facing toward the lathing tool (not shown), that is, outboard of the collet 20. The control means 100 brakes rotation of the collet assembly to orient the side access opening 30 in a substantially upward direction, under the discharge gate 44. The control system 100 then causes gate 45 to open and the mold 10 to be machined drops by gravity into the collet 20 where it is initially positioned in the side boring by dowel pins 25 adjacent the positioning aperture 29. The control system then actuates delivery of air pressure to the plunger assembly 32 to advance it into contact with the lens mold 10, advancing the mold 10 into the positioning aperture securely positioning it for lathing. The control system actuates the lathing process, causing the lathe spindle and nosepiece to rotate at lathing speed. The control system advances tools necessary to accomplish the cutting, machining, polishing, etc. (not shown). When processing is complete, the control system 100 stops the lathe with the nosepiece side access opening 30 facing downward. Vacuum is applied to the plunger 32 and the lens mold 10 is stripped free of the plunger assembly. The mold 10 then falls by gravity into the collector chute 47 for discharge from the machine.

The control system of the invention is conventional and includes such sensors and timing devices as to accomplish the sequenced tasks indicated above.

Figure 5:
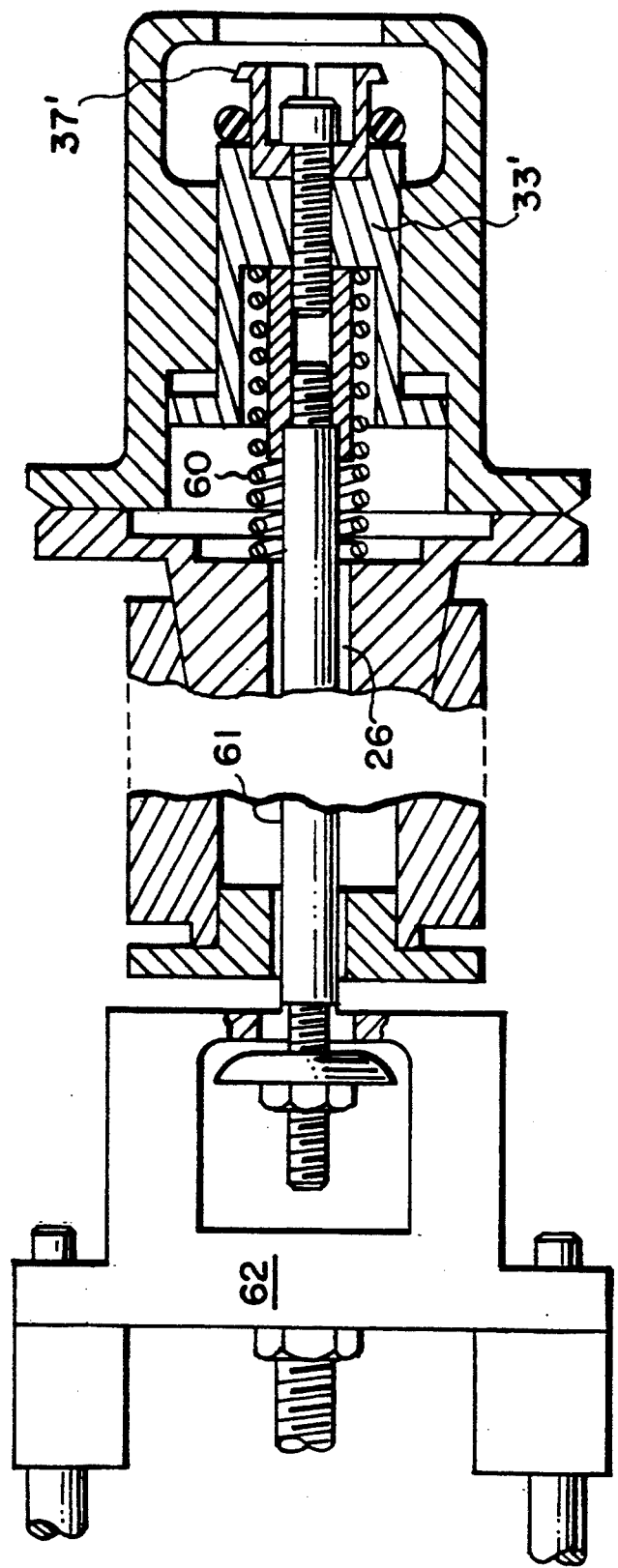
FIG. 5 is a schematic and partial sectional elevation of an alternative plunger activating system of the invention.

FIG. 5 shows a preferred mechanical arrangement, alternative to air/vacuum means, for operating the plunger mechanics of the invention. In this system, a spring 60 biases the plunger 33' in the advanced position wherein the mold (not shown) is positioned for machining. A shaft 61 is fixed to the plunger extending through the spindle passageway 26, the position of which is controlled by an operator 62. In operation when the collet is to receive a mold, the operator retracts the plunger by pulling the rod rearward. During machining, the operator 62 moves forward, allowing the spring 60 to secure the mold in position, as shown in FIG. 4. Upon completion of machining, the rod 61 is again retracted and the mold strips from the securing fingers 31' of the plunger 33'.

While the description of the invention has been directed to machining or lathing contact lenses in a cylindrical mold, it will be evident to those skilled in the art that the invention is applicable to the machining of any workpiece having a surface that may be secured in a collet.

What is claimed:

1. An apparatus for automated feeding of workpieces intermittently into a machine for lathing, comprising:
    a collet for positioning and securing a workpiece for lathing, said collet being fixed at a first end thereof to a lathe spindle rotatable about an axis of rotation, and including at an opposed distal end a nosepiece having a hollow cylindrical portion,
    wherein said hollow cylindrical portion is in axial alignment with said axis of rotation of said lathe spindle and rotatable with said lathe spindle, said hollow cylindrical portion including:
    a distal endwall having an aperture therein to accommodate and accurately position a workpiece for lathing, said aperture being aligned axially with said axis of rotation;
    a lateral cylindrical surface extending from said distal endwall towards said first end, said lateral cylindrical surface having an aperture therein forming an access opening in the nosepiece for a workpiece to enter into an interior of said hollow cylindrical portion, and
    dowel means opposed to said access opening and adjacent said aperture in said distal endwall, for initially positioning a workpiece received in said interior of said hollow cylindrical portion at an initial position adjacent to said aperture in said distal endwall;
    plunger means in the interior of said hollow cylindrical portion, for advancing a workpiece from said initial position and into said aperture in said distal endwall;
    delivery means adjacent said collet assembly, for delivering individual workpieces to said collet assembly, said delivery means including a gate means located above and in alignment with said nosepiece, for dropping individual workpieces by gravity into said access opening; and
    control means for orienting said access opening of the nosepiece in an upward direction to receive a workpiece from said gate means and actuating said gate means to drop by gravity a workpiece into said access opening.

2. The apparatus of claim 1, wherein said plunger means includes a plunger element and means for intermittently reciprocating said plunger element to advance and retract said workpiece between said initial position and said aperture in said distal endwall.

3. The apparatus of claim 2, wherein said means for intermittently reciprocating said plunger element includes pressurized air and vacuum means.

4. The apparatus of claim 2, wherein said means for intermittently reciprocating said plunger element comprises a rod passing through an axial passageway in said spindle and fixed at a first end to said plunger element, for advancing and retracting said plunger element in cooperation with an operator at an opposed end of said rod.

5. The apparatus of claim 4, wherein said means for intermittently reciprocating said plunder element further comprises a spring means fixed at an end of said plunger element opposed to said first end thereof, for biasing said plunger element towards said aperture in said distal endwall.

6. The apparatus of claim 1, wherein said workpieces are contact lens molds in which a contact lens is formed, said aperture in said distal endwall having a diameter that engages a circumferential positioning surface on a contact lens mold while accurately positioning the contact lens mold for lathing.

7. The apparatus of claim 1, further comprising transporting means for transporting machined workpieces from said collet assembly after lathing, said transporting means including a collecting means located below and in alignment with said nosepiece, for collecting machined workpieces dropped by gravity from said access opening.

8. The apparatus of claim 1, wherein said plunger means includes a finger element having resilient biased fingers engageble with a workpiece.

9. An apparatus for automated feeding of contact lens molds intermittently into a machine for lathing, comprising:
    a collet assembly for positioning and securing a contact lens mold for lathing, said collet assembly including:
    a faceplate fixed at one end thereof to a lathe spindle rotatable about an axis of rotation, said faceplate having a flange at an opposite end thereof; and
    a nosepiece that is substantially a flanged cylinder having at one end a flange fixed to the flange of the faceplate, and a hollow cylindrical portion at an opposed distal end of the nosepiece,
    said faceplate and said nosepiece being in axial alignment with said axis of rotation of said lathe spindle, and rotatable with said lathe spindle,
    said hollow cylindrical portion including:
    a distal endwall at said opposed distal end of the nosepiece, said distal endwall having an aperture therein to accommodate and accurately position a contact lens mold for lathing,
    a lateral cylindrical surface extending between the flange of the nosepiece and said distal endwall, said lateral cylindrical surface having diametrically opposed apertures therein, wherein one of said diametrically opposed apertures forms an access opening in the nosepiece for a contact lens mold to enter into an interior of said hollow cylindrical portion, and
    dowel pins spanning the other of said diametrically opposed side openings, for contacting and stopping a contact lens mold received in said interior of said hollow cylindrical portion at an initial position adjacent to said aperture in the distal endwall;
    an axially reciprocating plunger extending axially in the interior of said hollow cylindrical portion, for advancing and retracting a contact lens mold between said initial position and said aperture in the distal endwall;
    mold delivery means for delivering individual contact lens molds to said collet assembly, said mold delivery means including a gate means located above and in alignment with said nosepiece, for dropping individual molds by gravity into said access opening;
    mold transporting means for transporting contact lens molds from said collet assembly after lathing, said mold transporting means including a collecting means located below and in alignment with said nosepiece, for collecting lathed contact lens molds dropped by gravity from said access opening; and control means for orienting said access opening of the nosepiece in an upward direction to receive a contact lens mold from said gate means, actuating said gate means to drop by gravity a contact lens mold into said access opening, and orienting said access opening of the nosepiece in a downward position to discharge a lathed contact lens into said collecting means.

10. An apparatus for automated feeding of workpieces intermittently into a machine for lathing, comprising:

a collet for positioning and securing a workpiece for lathing, said collet being fixed at a first end thereof to a lathe spindle rotatable about an axis of rotation, and including at an opposed distal end a nosepiece having a hollow cylindrical portion, wherein said hollow cylindrical portion is in axial alignment with said axis of rotation of said lathe spindle and rotatable with said lathe spindle, said hollow cylindrical portion including:

a distal endwall having an aperture therein to accommodate and accurately position a workpiece for lathing, said aperture being aligned axially with said axis of rotation;

a lateral cylindrical surface extending from said distal endwall towards said first end, said lateral cylindrical surface having an aperture therein forming an access opening in the nosepiece for a workpiece to enter into an interior of said hollow cylindrical portion, and dowel means opposed to said access opening and adjacent said aperture in said distal endwall, for initially positioning a workpiece received in said interior of said hollow cylindrical portion at an initial position adjacent to said aperture in said distal endwall;

plunger means in the interior of said hollow cylindrical portion, for advancing a workpiece from said initial position and into said aperture in said distal endwall; and delivery means adjacent said collet assembly, for delivering individual workpieces to said collet assembly, said delivery means including a gate means located above and in alignment with said nosepiece, for dropping individual workpieces by gravity into said access opening.

* * * * *